United States Patent

Schefczik et al.

Patent Number: 5,608,041
Date of Patent: Mar. 4, 1997

[54] AZO DYESTUFFS CONTAINING A DIAZO COMPONENT FROM THE ANILINE SERIES AND COUPLING COMPONENT FROM THE TRIAZOLOPYRIDINE SERIES

[75] Inventors: Ernst Schefczik, Ludwigshafen; Volker Bach; Helmut Reichelt, both of Neustadt; Clemens Grund, Mannheim, all of Germany

[73] Assignee: BASF Aktiengesellschaft, Ludwigshafen, Germany

[21] Appl. No.: 591,565

[22] PCT Filed: Aug. 19, 1994

[86] PCT No.: PCT/EP94/02756

§ 371 Date: Feb. 14, 1996

§ 102(e) Date: Feb. 14, 1996

[87] PCT Pub. No.: WO95/06687

PCT Pub. Date: Mar. 9, 1995

[30] Foreign Application Priority Data

Aug. 31, 1993 [DE] Germany .................. 43 29 296.8

[51] Int. Cl.⁶ .................. C09B 29/36; D06P 3/52
[52] U.S. Cl. .................. 534/752; 8/922; 8/924; 8/532
[58] Field of Search .................. 534/752

[56] References Cited

U.S. PATENT DOCUMENTS 5,147,845  9/1992  Sens et al. .................. 503/277

FOREIGN PATENT DOCUMENTS 0416434  3/1991  European Pat. Off. .
4020768  1/1992  Germany .................. 534/752
4326758  2/1995  Germany .

Primary Examiner—Fiona T. Powers
Attorney, Agent, or Firm—Oblon, Spivak, McClelland, Maier & Neustadt, P.C.

[57] ABSTRACT

Triazolopyridine azo dyestuffs of the formula

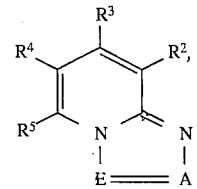

where one of the two radicals A and E is nitrogen and the other is a radical of the formula C—$R^1$, where $R^1$ is unsubstituted or substituted $C_1$–$C_{20}$-alkyl, unsubstituted or substituted phenyl or unsubstituted or substituted mercapto, one of the two radicals $R^2$ and $R^4$ is cyano, carbamoyl, carboxyl or $C_1$–$C_4$-alkoxycarbonyl and the other is a radical of the formula D—N=N—, where D is the radical of a diazo component from the aniline series, $R^3$ is unsubstituted or substituted $C_1$–$C_4$-alkyl or phenyl, and $R^5$ is hydroxyl, mercapto, unsubstituted or substituted amino or the radical of a CH-acidic compound, and their use for dyeing or printing textile materials are described.

7 Claims, No Drawings

AZO DYESTUFFS CONTAINING A DIAZO COMPONENT FROM THE ANILINE SERIES AND COUPLING COMPONENT FROM THE TRIAZOLOPYRIDINE SERIES

This application is a 371 of PCT/EP94/02756 filed Aug. 19, 1994.

DESCRIPTION

The present invention relates to novel triazolopyridine azo dye-stuffs of the formula I

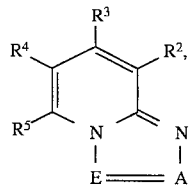

(I)

where

A is nitrogen,

E is a radical of the formula C—$R^1$, where $R^1$ is $C_1$–$C_{20}$-alkyl, which is unsubstituted or substituted and can be interrupted by 1 to 4 ether oxygen atoms, or is unsubstituted or substituted phenyl, mercapto or unsubstituted or substituted $C_1$–$C_{20}$-alkylthio, one of the two radicals $R^2$ and $R^4$ is cyano, carbamoyl, carboxyl or $C_1$–$C_4$-alkoxycarbonyl and the other is a radical of the formula D—N=N—, where D is a radical of a diazo component from the aniline series, $R^3$ is $C_1$–$C_4$-alkyl which may also be interrupted by an ether oxygen atom, or phenyl and $R^5$ is hydroxyl, mercapto, the radical —$NY^1Y^2$, where $Y^1$ and $Y^2$ are identical or different and independently of one another in each case are hydrogen or $C_1$–$C_4$-alkyl or, together with the nitrogen atom bonding them, are a 5- or 6-membered saturated heterocyclic radical, or the radical of a CH-acidic compound, with the proviso that if $R^4$ is the radical of the formula D—N=N—, the two radicals A and E can also be exchanged for one another, and their use for dyeing or printing textile materials.

Phenylazo dyestuffs which contain a coupling component from the 1,2,4-triazolo[1,5-a]pyridine series have already been disclosed in DE-A-4 020 768. The phenylazo group is located in ring position 4 of the heterocyclic system. However, it has been shown that these dyestuffs still have deficiencies in their applicational properties.

It is an object of the present invention to provide novel azo dyestuffs containing a coupling component from the triazolopyridine series and a diazo component from the aniline series and which have a high fastness to dry heat setting and pleating, high brilliance and high dyeing power.

We have found that this object is achieved by the triazolopyridine azo dyestuffs of the formula I described in greater detail at the beginning.

The dyestuffs of the formula I can occur in two or more tautomeric forms, which are all covered by the patent claim. For example, the dyestuffs where $R^2$=D—N=N— can occur, inter alia, in the following tautomeric forms:

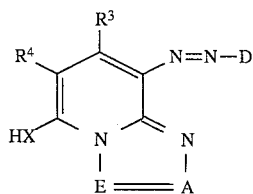

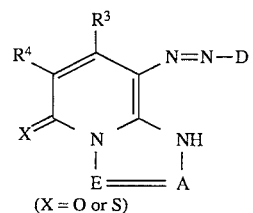

(X = O or S)

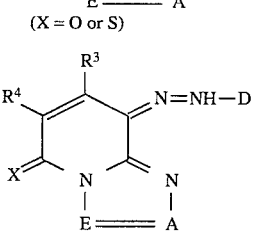

If in formula I substituted $C_1$–$C_{20}$-alkyl radicals occur, suitable substituents can be e.g. unsubstituted or substituted phenyl, unsubstituted or substituted phenoxy, carboxyl or $C_1$–$C_{20}$-alkoxycarbonyl whose alkyl chain may be interrupted by 1 to 4 ether oxygen atoms and can be substituted by phenyl or phenoxy. The alkyl radicals here as a rule have 1 or 2 substituents.

If in formula I alkyl radicals occur which are interrupted by ether oxygen atoms, those alkyl radicals are preferred which are interrupted by 1 or 2 ether oxygen atoms.

If in formula I substituted phenyl radicals occur, suitable substituents can be e.g. $C_1$–$C_4$-alkyl, $C_1$–$C_4$-alkoxy, halogen, in this case in particular chlorine or bromine, nitro, cyano or carboxyl. The phenyl radicals here as a rule have 1 to 3 substituents.

If $R^5$ in formula I is a radical of a CH-acidic compound, this radical can be derived e.g. from nitromethane, nitroethane or from compounds of the formulae IV to IX

 (IV)

 (V)

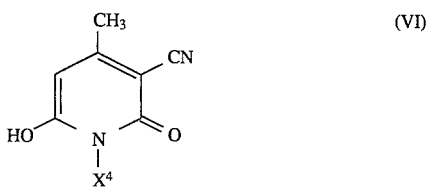 (VI)

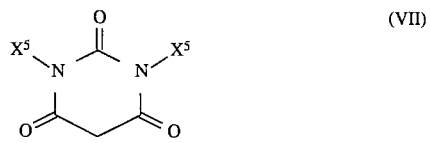 (VII)

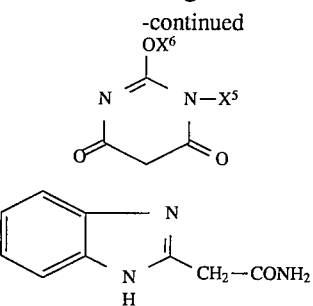

(VIII)

(IX)

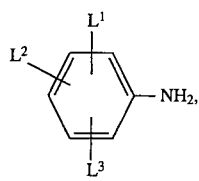

where $X^1$ is cyano, nitro, $C_1$–$C_4$-alkanoyl, benzoyl which is unsubstituted or substituted by $C_1$–$C_4$-alkyl, $C_1$–$C_4$-alkoxy or halogen, $C_1$–$C_4$-alkylsulfonyl, phenylsulfonyl which is unsubstituted or substituted by $C_1$–$C_4$-alkyl, $C_1$–$C_4$-alkoxy or halogen, carboxyl, $C_1$–$C_4$-alkoxycarbonyl, phenoxycarbonyl, carbamoyl, $C_1$–$C_4$-mono- or -dialkylcarbamoyl, phenylcarbamoyl which is unsubstituted or substituted by $C_1$–$C_4$-alkyl, $C_1$–$C_4$-alkoxy or halogen, phenyl which is unsubstituted or substituted by $C_1$–$C_4$-alkyl, $C_1$–$C_4$-alkoxy, halogen or nitro, benzothiazol-2-yl, benzimidazol-2-yl, 5-phenyl-1,3,4-thiadiazol-2-yl or 2-hydroxy-quinoxalin-3-yl, $X^2$ is $C_1$–$C_4$-alkyl or $C_1$–$C_4$-alkoxy, $X^3$ is $C_1$–$C_4$-alkoxycarbonyl, phenylcarbamoyl or benzimidazol-2-yl, $X^4$ is hydrogen or $C_1$–$C_6$-alkyl, $X^5$ is hydrogen, $C_1$–$C_4$-alkyl or phenyl and $X^6$ is $C_1$–$C_4$-alkyl.

CH-acidic compounds of the formulae IV, V or VII may in particular be mentioned here, where $X^1$ is cyano, acetyl, benzoyl, $C_1$–$C_4$-alkoxycarbonyl, phenoxycarbonyl, $C_1$–$C_2$-monoalkylcarbamoyl, phenylcarbamoyl, phenyl, benzimidazol-2-yl, benzothiazol-2-yl or 5-phenyl-1,3,4-thiadiazol-2-yl, $X^2$ is $C_1$–$C_2$-alkoxy, $X^3$ is $C_1$–$C_2$-alkoxycarbonyl or phenylcarbamoyl and $X^5$ is methyl.

The radical D in the dyestuffs according to the invention is derived from a diazo component from the aniline series.

Suitable diazo components D—$NH_2$ correspond, for example, to the formula II $$\underset{L^3}{\underset{|}{\overset{L^1}{\underset{|}{\overset{|}{L^2}}}}} \phantom{x} \text{—} NH_2, \qquad (II)$$

where $L^1$, $L^2$ and $L^3$ are identical or different and independently of one another in each case are hydrogen, $C_1$–$C_{13}$-alkyl, $C_1$–$C_4$-alkoxy which is unsubstituted or substituted by $C_1$–$C_4$-alkoxy, halo-$C_1$–$C_4$-alkoxy, hydroxy-$C_1$–$C_4$-alkoxy or cyano-$C_1$–$C_4$-alkoxy, $C_1$–$C_4$-alkylthio which is unsubstituted or substituted by $C_1$–$C_4$-alkoxy or $C_1$–$C_4$-alkylthio, phenoxy, halogen, cyano, $C_1$–$C_4$-alkanoylamino, $C_1$–$C_4$-alkylsulfonylamino, the radical $NY^1Y^2$, where $Y^1$ and $Y^2$ in each case have the abovementioned meanings, or $L^1$ and $L^2$ together are the radical of the formula O—$C_2H_4$—O.

The radicals $R^1$, $R^3$, $L^1$, $L^2$ and $L^3$ are e.g. methyl, ethyl, propyl, isopropyl, butyl, isobutyl or sec-butyl.

The radicals $R^1$, $L^1$, $L^2$ and $L^3$ are furthermore e.g. pentyl, isopentyl, neopentyl, tert-pentyl, hexyl, heptyl, 1-ethylpentyl, octyl, isooctyl, 2-ethylhexyl, nonyl, isononyl, decyl, isodecyl, undecyl, dodecyl, tridecyl or isotridecyl (the above names isooctyl, isononyl, isodecyl and isotridecyl are trivial names and originate from the alcohols obtained by the oxo synthesis—cf. for this Ullmanns Enzyklopädie der technischen Chemie [Ullmann's Encyclopedia of Industrial Chemistry], 4th Edition, volume 7, pages 215 to 217, and also Volume 11, pages 435 and 436).

The radicals $R^1$ are furthermore e.g. tetradecyl, pentadecyl, hexadecyl, heptadecyl, octadecyl, nonadecyl, eicosyl, 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl, 2- or 4-propoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 2- or 4-butoxybutyl, 4,8-dioxadecyl, 3,6,9-trioxadecyl, 3,6,9-trioxaundecyl, 3,6,9,12-tetraoxatridecyl, 3,6,9,12-tetraoxatetradecyl, 2-carboxyethyl, 2-methoxycarbonylethyl, benzyl, 1- or 2-phenylethyl, 2-, 3,- or 4-methylbenzyl, 2-, 3- or 4-methoxybenzyl, 2-, 3- or 4-chlorobenzyl, 2-, 3- or 4-nitrobenzyl, 3-benzyloxypropyl, phenoxymethyl, 6-phenoxy-4-oxahexyl, 8-phenoxy-4-oxaoctyl, phenyl, 2-, 3- or 4-methylphenyl, 2-, 3- or 4-methoxyphenyl, 2-, 3- or 4-chlorophenyl, 2-, 3- or 4-nitrophenyl, 2-, 3- or 4-carboxylphenyl, methylthio, ethylthio, propylthio, isopropylthio, butylthio, isobutylthio, sec-butylthio, pentylthio, isopentylthio, neopentylthio, tert-pentylthio, hexylthio, heptylthio, 1-ethylpentylthio, octylthio, isooctylthio, 2-ethylhexylthio, nonylthio, isononylthio, decylthio, isodecylthio, undecylthio, dodecylthio, tridecylthio, isotridecylthio, tetradecylthio, pentadecylthio, hexadecylthio, heptadecylthio, octadecylthio, nonadecylthio or eicosylthio.

The radicals $R^3$ are furthermore e.g. methoxymethyl, ethoxymethyl, 2-methoxyethyl or 2-ethoxyethyl.

The radicals $R^2$ are e.g. methoxycarbonyl, ethoxycarbonyl, propoxycarbonyl, isopropoxycarbonyl, butoxycarbonyl, isobutoxycarbonyl or sec-butoxycarbonyl.

The radicals $R^5$ are e.g., as are furthermore also the radicals $L^1$, $L^2$ and $L^3$, amino, mono- or dimethylamino, mono- or diethylamino, mono- or dipropylamino, mono- or diisopropylamino, mono- or dibutylamino, pyrrolidino, piperidino, morpholino, piperazino or N-($C_1$–$C_4$-alkyl)piperazino.

The radicals $L^1$, $L^2$ and $R^3$ are furthermore e.g. methoxy, ethoxy, propoxy, isopropoxy, butoxy, isobutoxy, sec-butoxy, 2-methoxyethoxy, 2-ethoxyethoxy, 2-propoxyethoxy, 2-isopropoxyethoxy, 2-butoxyethoxy, 2- or 3-methoxypropoxy, 2- or 3-ethoxypropoxy, 2- or 3-propoxypropoxy, 2- or 3-butoxypropoxy, 2- or 4-methoxybutoxy, 2- or 4-ethoxybutoxy, 2- or 4-propoxybutoxy, 2- or 4-butoxybutoxy, 2-(2-chloroethoxy)ethoxy, 2-(2-hydroxyethoxy)ethoxy, 2-(2-cyanoethoxy)ethoxy, methylthio, ethylthio, propylthio, isopropylthio, butylthio, 2-methoxyethylthio, 2-methylthioethylthio, fluorine, chlorine, bromine, formylamino, acetylamino, propionylamino, butyrylamino, isobutyrylamino, methylsulfonylamino, ethylsulfonylamino, propylsulfonylamino, isopropylsulfonylamino or butylsulfonylamino.

Preferred triazolopyridine azo dyestuffs of the formula I are those where one of the two radicals $R^2$ and $R^4$ is cyano and the other is a radical of the formula D—N=N—, where D has the abovementioned meaning.

Preferred triazolopyridine azo dyestuffs of the formula I are those where $R^2$ is cyano.

Preferred triazolopyridine azo dyestuffs of the formula I are furthermore those where $R^5$ is hydroxyl.

Preferred triazolopyridine azo dyestuffs of the formula I are furthermore those where $R^3$ is $C_1$–$C_4$-alkyl, in particular methyl.

Preferred triazolopyridine azo dyestuffs of the formula I are furthermore those where $R^1$ is $C_1$–$C_{13}$-alkyl which may be interrupted by 1 or 2 ether oxygen atoms, or is $C_1$–$C_{13}$-alkylthio.

Preferred triazolopyridine azo dyestuffs of the formula I are furthermore those where D—N=N— is the radical of the formula

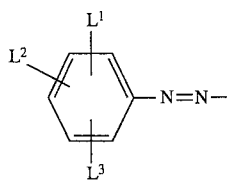

where $L^1$, $L^2$ and $L^3$ independently of one another in each case are hydrogen, $C_1$–$C_{13}$-alkyl, $C_1$–$C_4$-alkoxy, $C_1$–$C_4$-alkoxy-$C_2$–$C_4$-alkoxy, $C_1$–$C_4$-alkylthio or halogen, or $L^1$ and $L^2$ together are the radical of the formula O—$C_2H_4$—O.

Particularly preferred triazolopyridine azo dyestuffs of the formula I are those where D—N=N— is the radical of the formula

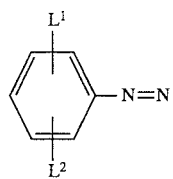

where $L^1$ and $L^2$ independently of one another in each case are hydrogen, $C_1$–$C_4$-alkyl, $C_1$–$C_4$-alkoxy or $C_1$–$C_4$-alkoxy-$C_2$–$C_4$-alkoxy.

The triazolopyridine azo dyestuffs of the formula I according to the invention can be prepared by methods known per se. For example, a diazo component of the formula II can be diazotized in a manner known per se and coupled with a coupling component of the formula IIIa or IIIb

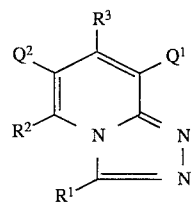
(IIIa)

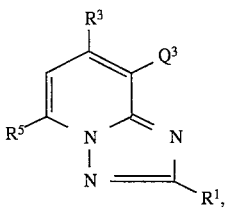
(IIIb)

where one of the two radicals $Q^1$ and $Q^2$ is hydrogen and the other is cyano, carbamoyl, carboxyl or $C_1$–$C_4$-alkoxycarbonyl and $Q^3$ is cyano, carbamoyl, carboxyl or $C_1$–$C_4$-alkoxycarbonyl and $R^1$ and $R^5$ in each case have the abovementioned meanings.

The coupling components of the formulae IIIa and IIIb are known per se and are described e.g. in the earlier German Patent Application P 43 26 758.0 or in U.S. Pat. No. 5,101,028.

The triazolopyridine azo dyestuffs according to the invention are advantageously suited to the dyeing or printing of textile materials. These are, for example, fibers composed of cellulose esters or polyesters, but also of polyamides, or mixed fabrics of polyesters and cellulose fibers. Dyeings or prints having high fastness to dry heat setting and pleating and high brilliance are obtained here. The novel dyestuffs also have a high dyeing power.

To achieve a favorable dyestuff composition, it can be advantageous in some cases to use mixtures of the dyestuffs of the formula I with one another for dyeing.

The triazolopyridine azo dyestuffs according to the invention are furthermore advantageously suited for thermal transfer from a support to a plastic-coated paper by means of an energy source (see e.g. EP-A-416 434).

The following examples will illustrate the invention in greater detail.

EXAMPLE 1 a) Diazotization 15.20 g (0.10 mol) of 4-tert-butylaniline were dissolved with cooling in a mixture of 40 ml of water and 30 g of 35% strength by weight hydrochloric acid, and 100 g of ice were added. 32 g of 23% strength by weight aqueous sodium nitrite solution were added dropwise at from 0° to 5° C. and the mixture was then stirred at from 0° to 5° C. for 3 h.

b) Coupling 5.05 g (0.025 mol) of 4-cyano-2-ethyl-7-hydroxy-5-methyl-1,2,4-triazolo[1,5-a]pyridine were dissolved in a mixture of 10 ml of N-methylpyrrolidone, 30 g of ice, 4 g of 50% strength by weight sodium hydroxide solution and 2 g of sodium hydrogencarbonate and about 100 g of ice were added. The diazonium salt solution described in a) was added dropwise at from 0° to 5° C. in the course of 4 h. The mixture was then stirred for 4 h. After coupling was complete, solid was filtered off with suction, washed until neutral and dried at 60° C. under reduced pressure. 7.2 g (80% of theory) of the dyestuff of the formula

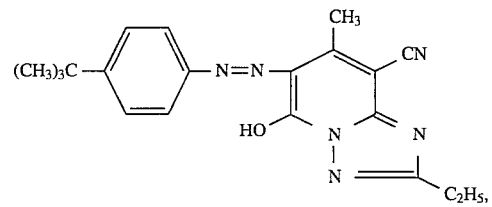

(M.p.: 226°–228° C.; $\lambda_{max}$ ($CH_2Cl_2$): 476 nm)
were obtained, which dyes polyester in a yellow shade.

EXAMPLE 2 a) Diazotization 3.65 g (0.02 mol) of 2-butoxy-5-methylaniline were dissolved in 80 ml of glacial acetic acid/propionic acid (3:1 v/v) and 16 ml of 85% strength by weight sulfuric acid. 10.4 g of nitrosylsulfuric acid (about 42% by weight $N_2O_3$) were added dropwise at at most −5° C. and the mixture was then stirred at from −5° to 0° C. for 2 h.

b) Coupling 4.40 g (0.022 mol) of 4-cyano-2-ethyl-7-hydroxy-5-methyl-1,2,4-triazolo[1,5-a]pyridine were dissolved in 90 ml of N-methylpyrrolidone and 100 ml of water, 0.5 g of sulfamic acid and about 400 g of ice were added. The diazonium salt solution described in a) was added dropwise to this solution at from −5° to 0° C., the pH being adjusted to 7.0 using 25% strength by weight sodium hydroxide solution. After coupling was complete, the dyestuff was filtered off at 60° C., washed until neutral and dried at 60° C. under reduced pressure. 3.9 g (50% of theory) of the dyestuff of the formula

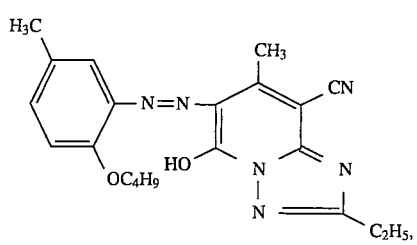

(M.p.: 206°–210° C.; $\lambda_{max}$ (CH$_2$Cl$_2$): 505 nm)
were obtained, which dyes polyester in a red shade.

The dyestuffs listed in the following Tables 1 to 3 can be obtained in a similar manner.

TABLE 1

| Ex. No. | Q$^1$ | Q$^2$ | M.p. [°C.] | λmax[nm] (in CH$_2$Cl$_2$) | Color shade on polyester |
|---|---|---|---|---|---|
| 3 | C$_6$H$_5$ | C$_2$H$_5$ | 231–232 | | yellow |
| 4 | (H$_3$C)$_2$HC—⟨C$_6$H$_4$⟩— | C$_2$H$_5$ | 206–207 | 476 | yellow |
| 5 | H$_5$C$_2$—⟨C$_6$H$_4$⟩— | C$_2$H$_5$ | 225–226 | 476 | yellow |
| 6 | 2,3-(H$_3$C)$_2$C$_6$H$_3$— | C$_2$H$_5$ | 207–208 | 478 | yellow |
| 7 | H$_9$C$_4$—⟨C$_6$H$_4$⟩— | C$_2$H$_5$ | 202–203 | | yellow |
| 8 | H$_{25}$C$_{12}$—⟨C$_6$H$_4$⟩— | C$_2$H$_5$ | 92–93 | 476 | yellow |
| 9 | 2,4,5-(H$_3$C)$_3$C$_6$H$_2$— | C$_2$H$_5$ | 226–227 | 488 | orange |
| 10 | H$_5$C$_6$O—⟨C$_6$H$_4$⟩— | C$_2$H$_5$ | 236–238 | 486 | orange |
| 11 | H$_5$C$_2$O—⟨C$_6$H$_4$⟩— | C$_2$H$_5$ | 241–242 | | orange |

TABLE 1-continued

[Structure: Q¹—N=N group on pyridazine ring with CH₃, CN, HO, and N—N=Q² substituents]

| Ex. No. | Q¹ | Q² | M.p. [°C.] | λmax[nm] (in CH₂Cl₂) | Color shade on polyester |
|---|---|---|---|---|---|
| 12 | 2-(SC₄H₉)phenyl | C₂H₅ | >230 | 476 | orange |
| 13 | 4-(H₃CO)phenyl | C₂H₅ | 234–235 | | orange |
| 14 | 2-CH₃, 5-Cl, 4-OCH₃ phenyl | C₂H₅ | 260–261 | 496 | orange |
| 15 | 4-CH₃, 2-(OC₂H₄OC₂H₅) phenyl | C₂H₅ | 180–185 | 500 | red |

TABLE 2

[Structure: Q¹—N=N group on pyridine ring with CH₃, CN, HO, and N=N—Q² substituents]

| Ex. No. | Q¹ | Q² | M.p. [°C.] | λmax[nm] (in CH₂Cl₂) | Color shade on polyester |
|---|---|---|---|---|---|
| 16 | 3-(OCH₃)phenyl | CH(CH₃)₂ | 216–217 | 470 | yellow |
| 17 | 2-(SC₄H₉)phenyl | (CH₂)₂OC₃H₇ | | 476 | yellow |

TABLE 2-continued
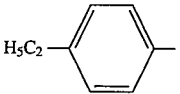
| Ex. No. | Q¹ | Q² | M.p. [°C.] | λmax[nm] (in CH₂Cl₂) | Color shade on polyester |
|---|---|---|---|---|---|
| 18 | 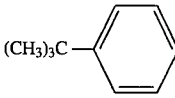 H₅C₂— | CH(CH₃)₂ | 221–222 | 476 | yellow |
| 19 | 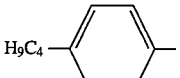 (CH₃)₃C— | CH(CH₃)₂ | 196–197 | 476 | yellow |
| 20 | 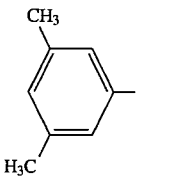 H₉C₄— | CH(CH₃)₂ | 230–231 | | yellow |
| 21 | 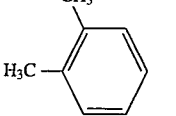 | CH(CH₃)₂ | 222–223 | | yellow |
| 22 | 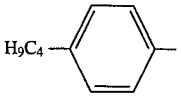 | CH(CH₃)₂ | 225–226 | 478 | yellow |
| 23 | 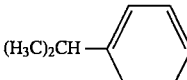 H₉C₄— | (CH₂)₂CO₂C₄H₉ | 164–165 | 478 | yellow |
| 24 | 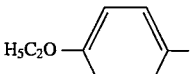 (H₃C)₂CH— | CH(CH₃)₂ | 170–171 | 476 | yellow |
| 25 | 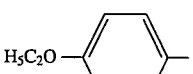 H₅C₂O— | (CH₂)₂CO₂C₄H₉ | 176–177 | 494 | orange |
| 26 | H₅C₂O— | (CH₂)₂OC₃H₇ | 190–191 | | orange |
| 27 | 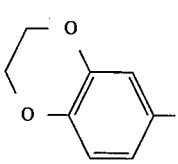 | CH(CH₃)₂ | 253–254 | 496 | orange |

TABLE 2-continued

Structure: Q¹—N=N group on pyridine ring with CH₃, CN, HO, and N=N—C(Q²) hydrazone substituents

| Ex. No. | Q¹ | Q² | M.p. [°C.] | λmax[nm] (in CH₂Cl₂) | Color shade on polyester |
|---|---|---|---|---|---|
| 28 | 4-H₃CO, 3-CH₃-phenyl | CH(CH₃)₂ | 240–241 | | orange |
| 29 | 4-H₃CO, 3-OCH₃-phenyl | (CH₂)₂OC₃H₇ | 198–200 | 510 | red |
| 30 | 4-H₃C, 2-CH₃, 4-OC₂H₄OC₂H₅-phenyl | CH(CH₃)₂ | 209 | 502 | red |
| 31 | 4-H₃C, 2-CH₃, 4-OC₄H₉-phenyl | CH(CH₃)₂ | >230 | 504 | red |
| 32 | 4-H₃C, 2-CH₃, 4-OC₄H₉-phenyl | (CH₂)₂OC₃H₇ | 150–154 | 504 | red |
| 33 | 4-H₃C, 2-CH₃, 4-OC₂H₄OC₂H₅-phenyl | (CH₂)₂OC₃H₇ | 98–102 | 500 | red |

TABLE 3

Structure: Q¹—N=N— attached to a pyridine ring with CH₃, CN, OH substituents, fused to N—N=C—Q²

| Ex. No. | Q¹ | Q² | M.p. [°C.] | λmax[nm] (in CH₂Cl₂) | Color shade on polyester |
|---|---|---|---|---|---|
| 34 | 4-(H₅C₂O)-C₆H₄– | C(CH₃)₃ | >230 | 492 | orange |
| 35 | 4-(H₅C₂O)-C₆H₄– | CH(C₂H₅)C₄H₉ | 140–141 | 494 | orange |
| 36 | 4-(H₅C₂O)-C₆H₄– | SC₄H₉ | 202–204 | 504 | red |
| 37 | 4-(H₃CO)-3-CH₃-C₆H₃– | (CH₂)₅C(CH₃)₃ | 137–141 | 500 | red |
| 38 | 4-(H₃CO)-3-CH₃-C₆H₃– | C₄H₉ | >230 | 502 | red |
| 39 | 4-(H₃CO)-3-CH₃-C₆H₃– | CH(C₂H₅)C₄H₉ | 158–165 | 502 | red |
| 40 | 3,4-(H₃CO)₂-C₆H₃– | CH(C₂H₅)C₄H₉ | 180–181 | 506 | red |
| 41 | 4-CH₃-2-(OC₂H₄OC₂H₅)-C₆H₃– | C(CH₃)₃ | 206–209 | 498 | red |
| 42 | 5-CH₃-2-(OC₄H₉)-C₆H₃– | C(CH₃)₃ | 219–221 | 502 | red |

TABLE 3-continued

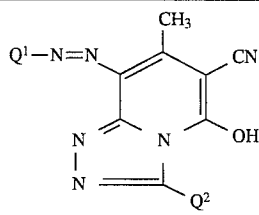

| Ex. No. | $Q^1$ | $Q^2$ | M.p. [°C.] | λmax[nm] (in $CH_2Cl_2$) | Color shade on polyester |
|---|---|---|---|---|---|
| 43 | H₃C—⌬—OC₂H₄OC₂H₅ | $(CH_2)_5C(CH_3)_3$ | 120–126 | 500 | red |
| 44 | H₃C—⌬—OC₄H₉ | $(CH_2)_5C(CH_3)_3$ | 124–129 | 504 | red |
| 45 | CH₃—⌬—OC₂H₄OC₂H₅ | $SC_4H_9$ | 156–160 | 512 | bluish-red |
| 46 | CH₃—⌬—OC₄H₉ | $SC_4H_9$ | 175–178 | 516 | bluish-red |
| 47 | H₃CO—⌬—OCH₃ | $C_4H_9$ | >230 | 515 | bluish-red |
| 48 | H₃CO—⌬—OCH₃ | $SCH(C_2H_5)C_4H_9$ | 195–197 | 525 | bluish-red |

We claim:

1. A triazolopyridine azo dyestuff of the formula I

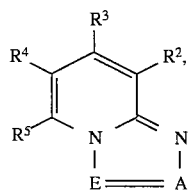

where

A is nitrogen,

E is a radical of the formula C—$R^1$, where $R^1$ is $C_1$–$C_{20}$-alkyl, which is unsubstituted or substituted and can be interrupted by 1 to 4 ether oxygen atoms, or is unsubstituted or substituted phenyl, mercapto or unsubstituted or substituted $C_1$–$C_{20}$-alkylthio, one of the two radicals $R^2$ and $R^4$ is cyano, carbamoyl, carboxyl or $C_1$–$C_4$-alkoxycarbonyl and the other is a radical of the formula D—N=N—, where D is a radical of a diazo component from the aniline series, $R^3$ is $C_1$–$C_4$-alkyl which may also be interrupted by an ether oxygen atom, or phenyl and $R^5$ is hydroxyl, mercapto, the radical —$NY^1Y^2$, where $Y^1$ and $Y^2$ are identical or different and independently of one another in each case are hydrogen or $C_1$–$C_4$-alkyl or, together with the nitrogen atom bonding them, are a 5- or 6-membered saturated heterocyclic radical, or the radical of a CH-acidic compound, with the proviso that if $R^4$ is the radical of the formula D—N=N—, the two radicals A and E can also be exchanged for one another.

2. A triazolopyridine azo dyestuff as claimed in claim 1, wherein one of the two radicals $R^2$ and $R^4$ is cyano and the other is a radical of the formula D—N=N—, where D has the meaning mentioned in claim 1.

3. A triazolopyridine azo dyestuff as claimed in claim 1, wherein $R^2$ is cyano.

4. A triazolopyridine azo dyestuff as claimed in claim 1, wherein $R^3$ is $C_1$–$C_4$-alkyl.

5. A triazolopyridine azo dyestuff as claimed in claim 1, wherein $R^1$ is $C_1$–$C_{13}$-alkyl which may be interrupted by 1 or 2 ether oxygen atoms, or is $C_1$–$C_{13}$-alkylthio.

6. A triazolopyridine azo dyestuff as claimed in claim 1, wherein $R^5$ is hydroxyl.

7. A process for dyeing or printing a textile material comprising applying the triazolopyridine azo dyestuff of claim 1 to said textile material.

* * * * *